United States Patent [19]
Murray et al.

[11] Patent Number: 6,067,629
[45] Date of Patent: May 23, 2000

[54] APPARATUS AND METHOD FOR PSEUDO-SYNCHRONOUS COMMUNICATION BETWEEN CLOCKS OF DIFFERENT FREQUENCIES

[75] Inventors: Joseph Murray, Scottsdale; Jeff J. McCoskey, Phoenix; Nick G. Eskandari, Chandler, all of Ariz.

[73] Assignee: Intel Corporation, Santa Clara, Calif.

[21] Appl. No.: 09/131,963

[22] Filed: Aug. 10, 1998

[51] Int. Cl.[7] ....................................................... G06F 13/38
[52] U.S. Cl. ............................................. 713/400; 710/29
[58] Field of Search ................................... 713/400, 600; 709/237; 710/29, 61

[56] References Cited

U.S. PATENT DOCUMENTS

| | | | |
|---|---|---|---|
| 5,040,109 | 8/1991 | Bowhill et al. | 712/34 |
| 5,388,216 | 2/1995 | Oh | 710/29 |
| 5,388,231 | 2/1995 | Starr | 710/105 |
| 5,467,461 | 11/1995 | Nasu et al. | 711/147 |
| 5,548,732 | 8/1996 | Hoashi et al. | 710/105 |

*Primary Examiner*—Thomas M. Heckler
*Attorney, Agent, or Firm*—Blakely, Sokoloff, Taylor & Zafman LLP

[57] ABSTRACT

A transmit circuit operable to synchronize a data transmission is disclosed. The transmit circuit comprises a first circuit configured to transmit a plurality of data segments. The transmit circuit further comprises a second circuit coupled to the first circuit. The second circuit is configured to generate a strobe signal indicating the transmission of a first data segment of the plurality of data segments. The transmit circuit also comprises a third circuit coupled to the second circuit. The third component is configured to receive an acknowledge signal. Based on a logic transition of the acknowledge signal, the third circuit determines the transmission of a second data segment of the plurality of data segments.

12 Claims, 6 Drawing Sheets

APPARATUS AND METHOD FOR PSEUDO-SYNCHRONOUS COMMUNICATION BETWEEN CLOCKS OF DIFFERENT FREQUENCIES

FIELD OF THE INVENTION

The present invention relates to maintaining a pseudo-synchronous communication channel between components operating in different frequency domains. More particularly, the present invention relates to an apparatus and method for transferring data using a communication path that does not include metastable synchronizers.

BACKGROUND

Improvements in computer system designs has led to designs with a high speed microprocessor coupled to multiple memory modules and external components. Current microprocessors operate at a predetermined frequency ranging from 60 mega-hertz to 400 mega-hertz. However, the design of the memory modules and external components coupled to the microprocessor operate on a wide range of frequencies. Typically, the memory modules and external components operate at lower frequency than the microprocessor. To facilitate communication between microprocessors, memory modules, and external components prior art computer systems have developed different busses and bridging schemes. The industry standard architecture ("ISA") and the peripheral component interconnect ("PCI") bus designs are examples of the prior art bussing schemes used to couple microprocessors to memory modules and external components. Using the prior art bussing schemes and bridges, conventional computer systems are able to transfer data asynchronously between memory modules and external components.

Figure 1:
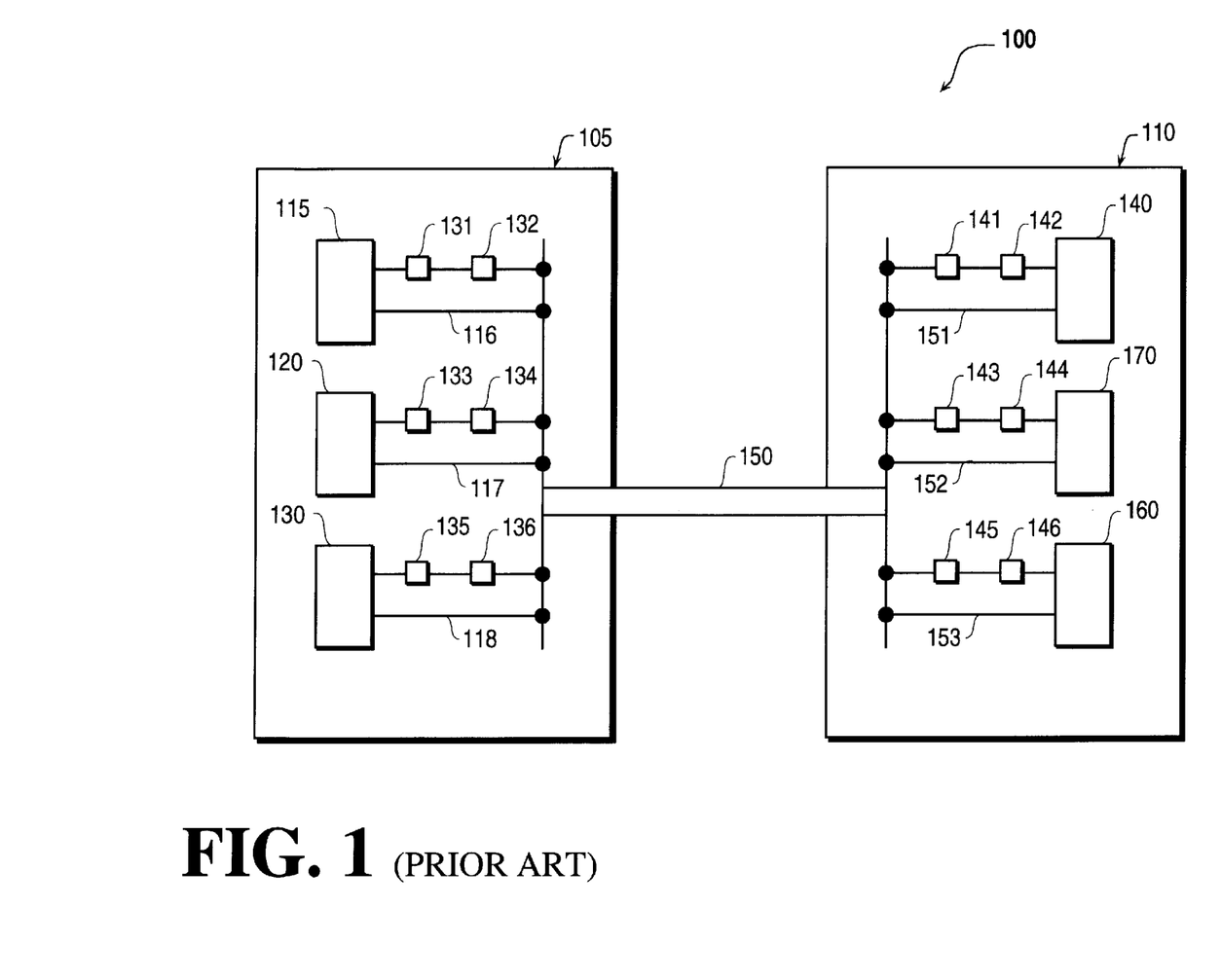
FIG. 1 illustrates a prior art data transfer system using an asynchronous bus.

FIG. 1 illustrates a prior art data transfer scheme on an asynchronous bus. In particular, system 100 includes component 105 coupled to component 110 via bus 150. Bus 150 is a bidirectional bus used to transfer data between component 105 and component 110. To generate and receive data on bus 150, component 105 includes three logic blocks (115, 120, and 130). Similarly, component 110 includes three logic blocks (140, 160, and 170) that generate and receive data on bus 150.

Component 105 operates at a different frequency than component 110. Accordingly, component 105 also includes metastable synchronizers 131–136. Similarly, component 110 also includes metastable synchronizers 141–146. Using a combination of logic blocks and metastable synchronizers, component 105 and component 110 exchange data. For example, to transfer data from logic block 130 to logic block 160, component 105 initially outputs the data value on line 118 in a first frequency domain. Subsequently, the outputted data is sampled by metastable synchronizers 145 and 146 and transferred to logic block 160. Thus, the metastable synchronizers allow the transfer of data between different frequency domains. Typically, the metastable synchronizers for each component comprise two back-to-back latches designed to have a minimum setup and hold times. The metastable synchronizer design is based on empirical data corresponding to the particular silicon process used to design component 110.

Using metastable synchronizers to transfer data between frequencies, however, creates numerous disadvantages. One disadvantage results from the creation of a race condition. In particular, provided a data block is transferred across a group of metastable synchronizers one of the metastable synchronizers can possibly latch data a cycle later than the remaining metastable synchronizers, thus resulting in the receiving component incurring data corruption. To counteract race conditions some prior art computer system require timing constraints on the input/output of all components within the computer system. Following a set of timing constraints, however, reduces the throughput of data across system 100.

Another disadvantage of using metastable synchronizers to transfer data between frequencies results from the incurred costs. For example, provided a thirty-two bit bus is coupled to a component, thirty-two metastable synchronizer are required. Thus, the circuitry included in the component increases, resulting in a higher cost during the manufacturing of the component. Furthermore, the increase in circuitry results in a larger die size, thus reducing manufacturing yield.

SUMMARY OF THE INVENTION

A transmit circuit operable to synchronize a data transmission is disclosed. The transmit circuit comprises a first circuit configured to transmit a plurality of data segments. The transmit circuit further comprises a second circuit coupled to the first circuit. The second circuit is configured to generate a strobe signal indicating the transmission of a first data segment of the plurality of data segments. The transmit circuit also comprises a third circuit coupled to the second circuit. The third component is configured to receive an acknowledge signal. Based on a logic transition of the acknowledge signal, the third circuit determines the transmission of a second data segment of the plurality of data segments.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method and apparatus for communication between components operating in different frequencies is disclosed. The method describes a hand shake protocol that exchanges acknowledge transmissions to initiate the transfer of data blocks between components. The apparatus includes history registers, exclusive-or ("xor") gates, and multiplexors. For one embodiment, the two components have a phase relation and operate in a clock frequency that is related by an M/N ratio—specifically, M is the frequency of the first component, N is the frequency of the second component, and both M and N are integers. Accordingly, the apparatus is placed in both the transmitting and receiving component. Placing the apparatus in both the transmitting and receiving components allows a frequency independent communication channel between the transmitting and receiving components. Additionally, the apparatus allows the transfer of large volumes of data between the two components without the use of metastable synchronizers. For an alternative embodiment, the receiving component operates at a higher frequency than the transmitting component. Accordingly, the apparatus is placed only in the transmitting component.

An intended advantage of an embodiment of the invention is to provide a communication protocol between components operating in different frequencies. For one embodiment, the communication protocol conditions the transfer of data based on the successful transmission of acknowledge signals. For an alternative embodiment, the communication protocol conditions the transfer of data based on the successful transmission of a transmit pointer and a read pointer. In particular, the transmit pointer is generated by the transmitting component and is used to indicate the current location of buffered data that is available for transmission. The read pointer is generated by the receiving component and is used to indicate the last segment of data read by the receiving component. Based on the location of the transmit and read pointers, the communication protocol selectively transmits blocks of data from the transmitting component to the receiving component.

Another intended advantage of an embodiment of the invention is to reduce the number of metastable synchronizers in receiving and transmitting components coupled to an asynchronous bus. In particular, a circuit with history register and logic blocks is placed in both the receiving and transmitting components. The circuitry synchronizes the transmission of data between the components, thus removing the need for metastable synchronizers along the transmission path.

Yet another intended advantage of an embodiment of the invention is to reduce data corruption during the transmission of data between components operating in different frequencies.

Figure 2A:
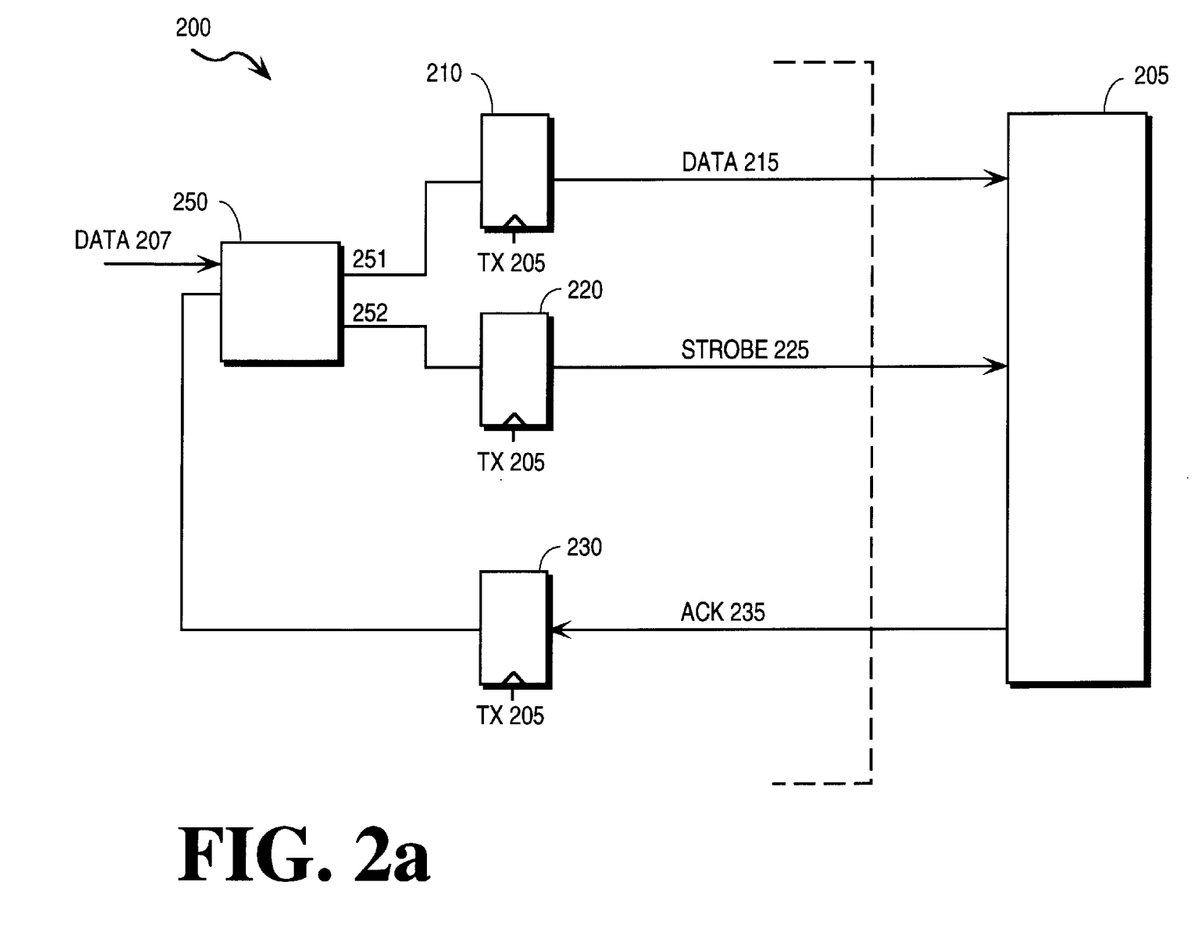
FIG. 2a shows one embodiment of a data transfer system using a toggled acknowledge.

FIG. 2a shows one embodiment of a data transfer system using a toggled acknowledge signal. In particular, component 200 operates in a first frequency domain and transmits DATA 215 to a component (205) operating in a second frequency domain. Component 200 uses STROBE 225 and ACK 235 to synchronize the transmission of DATA 215 between component 200 and component 205.

As illustrated in FIG. 2a, component 200 includes three latches (210, 220, and 230 clocked by TX 205) and logic block 250. Component 200 also includes output DATA 215, output STROBE 225, and an acknowledge input, ACK 235. For one embodiment, component 200 generates transmission data. The data is transferred to logic 250. Logic 250 stores the transmission data and generates a segment of data on line 251. In conjunction with the generated segment of data, logic 250 also generates an acknowledge signal with a logic value of "1" on line 252. The segment of data is stored in latch 210. Similarly, the acknowledge signal is stored in latch 220. Subsequently, both the segment of data and the acknowledge (strobe) signal are transmitted to component 205.

After receiving the acknowledge signal, component 205 toggles the logic value of the acknowledge signal resulting in a logic value of "0". The "0" value acknowledge signal is retransmitted to latch 230 along ACK 235. Logic 250 detects the "0" acknowledge signal and generates a new segment of data on lines 251. Subsequently, both the new segment of data and the "0" value acknowledge signal are transmitted to component 205 and the transmit cycle restarts. Accordingly, component 200 does not generate new data until the toggled acknowledge signal is received from component 205. Thus, the transmission of each segment of data is synchronized even though component 200 and component 205 are operating in different frequencies. For one embodiment, component 205 uses the toggled acknowledge signal to synchronize the transmission of a second segment of data from component 205 to component 200. Thus, the data throughput between component 200 and component 205 is doubled. For an alternative embodiment, in conjunction with the transmitted acknowledge signal, pointer information is exchanged between component 200 and component 205. In particular, a transmit pointer is generated by component 200 and a read pointer is generated by component 205. The transmit pointer is used to indicate the current location of data that is available for transmission along DATA 215. For one embodiment, the data is buffered in logic 250. The read pointer is used to indicate the last segment of data read by component 205. Based on the location of the transmit and read pointers, component 200 uses DATA 215 to selectively transmits blocks of data to component 205.

For one embodiment, component 200 is a direct memory access ("DMA") operating at 100 mega hertz ("MHz") and component 205 is a memory device operating at 66 MHz. Accordingly, DATA 215 is a DMA channel used to transmit data from the DMA to the memory device. For another embodiment, component 200 is a memory device operating at 66 MHz and DATA 215 comprises a PCI bus operating at 33 MHz Accordingly, component 205 comprises a receiving component coupled to the PCI bus.

FIG. 2a follows a hand shake protocol that allows the transmission of segments of data—hereinafter strobed data—between components based on an acknowledge signal generated by a transmitting or receiving component. The generation of acknowledge signals, however, can also follow a continuous loop that occurs independently of the logic included in the transmitting or receiving component.

Figure 2B:
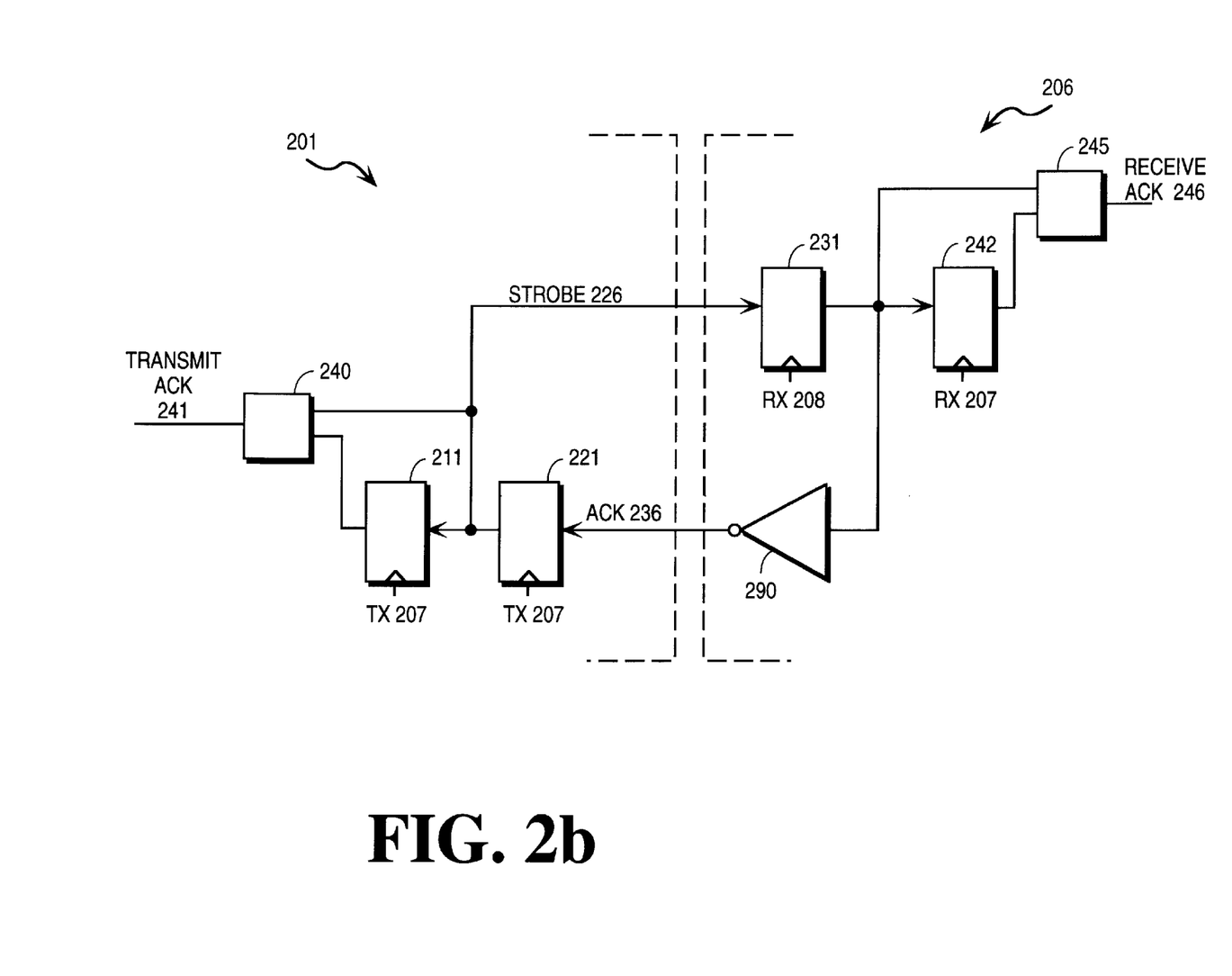
FIG. 2b illustrates one embodiment of a continuous acknowledge loop used to generate strobed data between a transmitting component and a receiving component.

FIG. 2b illustrates one embodiment of a continuous acknowledge loop used to generate strobed data between a transmitting component and a receiving component. In particular, component 201 operates in a first frequency domain and transmits data to a component (206) operating in a second frequency domain. Component 201 uses STROBE 226 and ACK 236 to synchronize the transmission of data between component 201 and component 206.

As illustrated in FIG. 2b, component 201 includes two latches (211 and 221 clocked by TX 207) and logic block 240. Component 201 also includes output STROBE 226 and an acknowledge input, ACK 236. ACK 236 is coupled to latch 221, which in turn, is coupled to latch 211 and logic block 240. In particular, an acknowledge signal transition on line ACK 236 indicates that component 206 has received an acknowledge signal on STROBE 226. As described above, for one embodiment, the transmitting component generates an acknowledge signal in conjunction with new data. Accordingly, the acknowledge signal transition on line ACK 236 indicates that component 206 has received new data from component 201. Logic 240 detects the acknowledge signal transition on line ACK 236 and strobes new data for transmissions between component 201 and 206 via TRANSMIT ACK 241. For an alternative embodiment, the transition of an analog acknowledge signal is used to indicate the successful transmission of data.

The continuous acknowledge loop used to generate the strobed data between component 201 and component 206 includes line STROBE 226, latch 231, inverter 290, line ACK 236, and latch 221. For one embodiment, during the reset of components 201 and 206, latches 231 and 221 are set to a zero value and STROBE 226 is toggled. The inversion created by inverter 290 results in the acknowledge signal continuously toggling in value during each successive transmission between component 201 and components 206. As previously, described the continuously transiting acknowledge signal is used to generate strobed data for transmission between component 201 and component 206. For another embodiment, component 206 also transmits data to component 201. To facilitate the data transmission, component 206 includes latch 242( clocked by RX 207) and logic 245. Logic 245 detects the acknowledge signal transition on line STROBE 226 and strobes new data for transmissions between component 206 and 201 via RECEIVE ACK 246.

Figure 3:
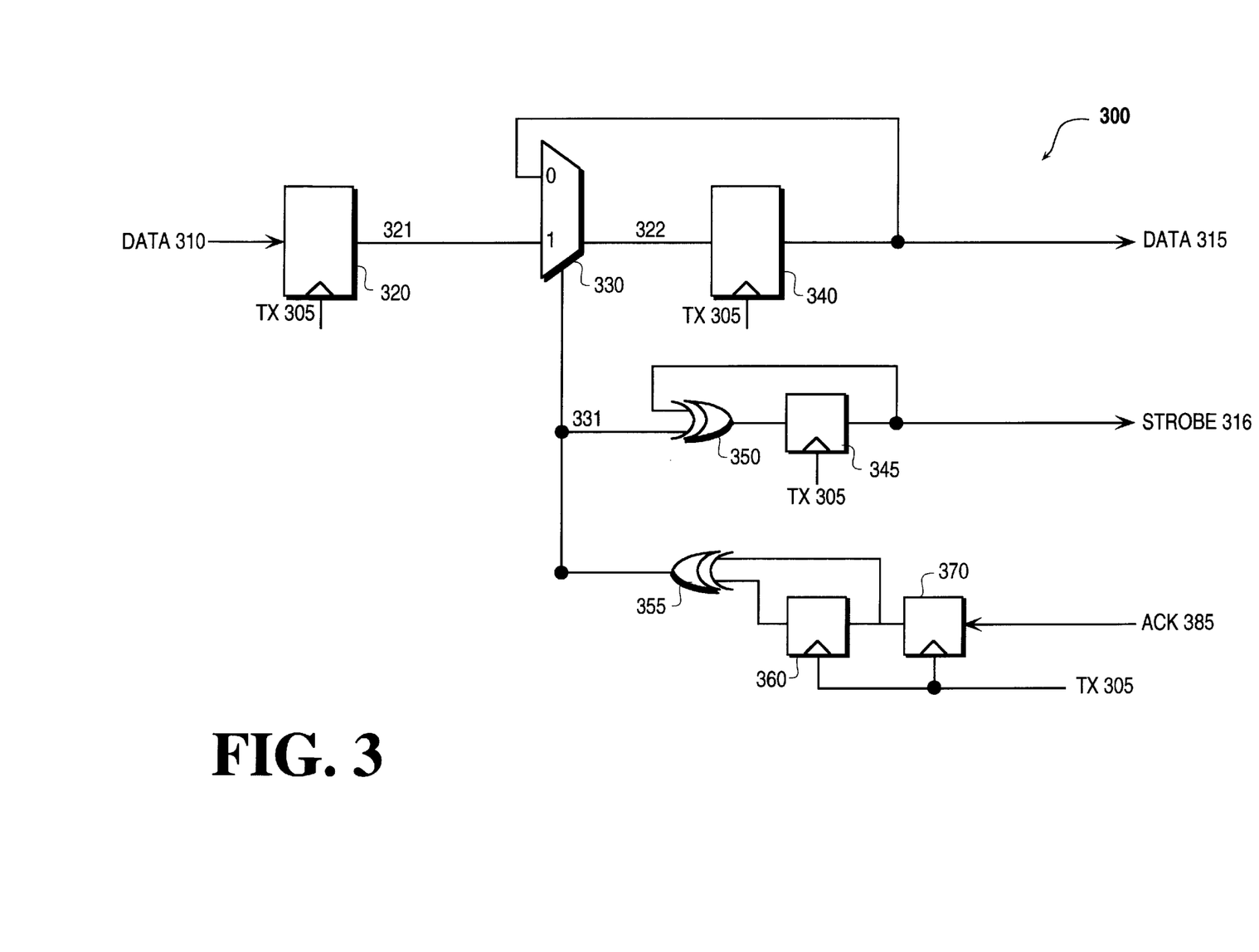
FIG. 3 shows one embodiment of a data transfer circuit included in a transmitting component.

FIG. 3 shows one embodiment of a data transfer circuit included in a transmitting component. For example, for one embodiment circuit 300 is used in component 200. Circuit 300 includes five latches (320, 340, 345, 360, and 370), two xor gates (350 and 355), and a select circuit (330). Circuit 300 also includes two outputs (DATA 315 and STROBE 316), signal DATA 310, and an input, ACK 385. Circuit 300 transfers data from DATA 310 to output DATA 315. The transfer of data in circuit 300 is conditioned on the value of node 331. In particular, node 331 is coupled to select circuit 330. Thus, based on the value of node 331, select circuit 330 couples latch 340 to DATA 315 or line 321. Thus, leading to the selective transfer of signal DATA 310.

For example, for one embodiment, node 331 has a logic value of '1.' Accordingly, select circuit 330 selects a first input. Provided the first input of select 330 is used, line 321 is directly coupled to line 322. The direct coupling results in the value of DATA 310 transferring to DATA 315. In particular, DATA 310 is coupled to the input of latch 320. The output of latch 320, in turn, is directly coupled to latch 340 because the first input of select 330 is selected. As illustrated in FIG. 3, both latches (320 and 340) are clocked by TX 305. Accordingly, the value of DATA 310 stored in latch 320 is transferred to DATA 315 after one clock cycles of TX 305.

Following the previous example, provided node 331 has a logic value of '0', DATA 315 remains unchanged. In particular, provided node 331 has a logic value of '0', the zero input of the select circuit 330 is selected. Accordingly, select circuit 330 creates a feed-back loop and DATA 315 is connected to line 322. Thus, the previous value of DATA 315 is used to generate the new value of DATA 315. Node 331 is also coupled to xor 350. In particular, the first input of xor 350 is coupled to node 331, the second input of or 350 is coupled in a feed-back loop to the output of latch 345. As illustrated in FIG. 3, latch 345 generates output STROBE 316 based on an input value generated by xor 350. Accordingly, the feed-back loop allows circuit 300 to compare the value of node 331 in one cycle to a value of STROBE 316 in a prior cycle. Thus, provided the logic values between node 331 and STROBE 316 differ, circuit 300 inverts the current value on STROBE 316.

The value of node 331 is determined by input ACK 385. Specifically, the value on input ACK 385 is captured by latch 370. Subsequently, the output of latch 370 is coupled to a first input of xor 355. The output of latch 370 is also captured by latch 360 and the output of latch 360 is coupled to the second input of xor 355. The logical output of xor 355 generates the value on node 331. Xor 355 compares the value of ACK 385 in a first cycle and a subsequent cycle of the TX 305 clock, provided there is a change in value between the two cycles, xor 355 inverts the value of node 331. For one embodiment, circuit 300 is included in a transmitting component operating in a pseudo-synchronous communication channel. For an alternative embodiment, circuit 300 is included in a transmitting component operating in an asynchronous communication channel. Accordingly, a second latch (not shown) is placed between latch 370 and ACK 385. The second latch and latch 370 act as meta-stable synchronizers for the acknowledge signal that is transmitted across the asynchronous channel.

Figure 4:
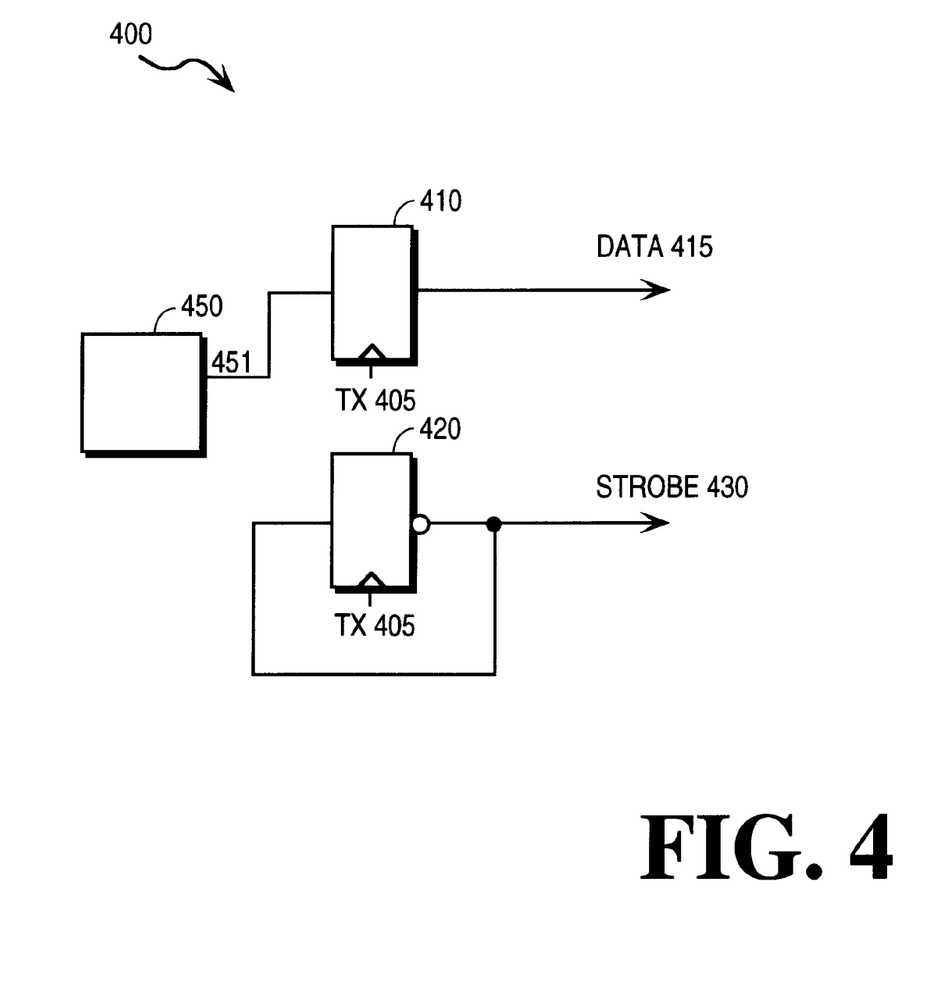
FIG. 4 shows one embodiment of a data transfer system used to transfer data from a transmitting component operating at a slower frequency than a receiving component.

The logic used to exchange acknowledge signals between components decreases when the receiving component is operating at a higher frequency than the transmitting component. FIG. 4 shows one embodiment of a data transfer system used to transfer data from a transmitting component operating at a slower frequency than a receiving component. In particular, component 400 operates in a first frequency domain and transmits DATA 415 to a receiving component (not shown) operating at a higher frequency. component 400 uses STROBE 430 to synchronize the transmission of DATA 15.

As illustrated in FIG. 4, component 400 includes two latches (410 and 420 clocked by TX 505) and logic block 450. Component 400 also includes output DATA 415 and output STROBE 430. For one embodiment, logic 450 generates a segment of data on line 451. Component 450 also generates an acknowledge signal on STROBE 430. The segment of data is stored in latch 410. Similarly, the acknowledge signal is stored in latch 420. Subsequently, both the segment of data and the acknowledge signal are transmitted to the receiving component via DATA 415 and STROBE 430, respectively. As previously described, the acknowledge signal is used to synchronize the transmission of DATA 415. Circuit 415, however, does not wait for a retransmission of the acknowledge signal from the receiving component before generating strobed data. Instead, component 400 independently toggles the acknowledge signal and retransmits the toggled acknowledge signal to the receiving component. Component 400 does not wait for a strobe signal because the receiving component operates at a higher frequency. Accordingly, the toggled acknowledge signal is detected by the receiving component before component 400 can toggle acknowledge signal again. Thus, the receiving component is aware of the strobed data available on DATA 415 before component 400 generates newly strobed data. STROBE 430 changes in every cycle of TX 405. For one embodiment, latches are inserted in the feed-back loop of latch 420, thus delaying the generation of the automatic acknowledge signal. Accordingly, the generation of newly strobed data on DATA 415 is also delayed to match the delay in the generation of the automatic acknowledge signal.

For one embodiment, component 400 is a memory device operating at 66 MHz and the receiving component is a DMA operating at 100 MHz. Accordingly, DATA 415 is a DMA channel used to transmit data from the DMA to the memory device. For another embodiment, component 400 is a transmitting component coupled to a PCI bus operating at 33 MHz and the receiving component is a memory device operating at 66 MHz.

Figure 5:
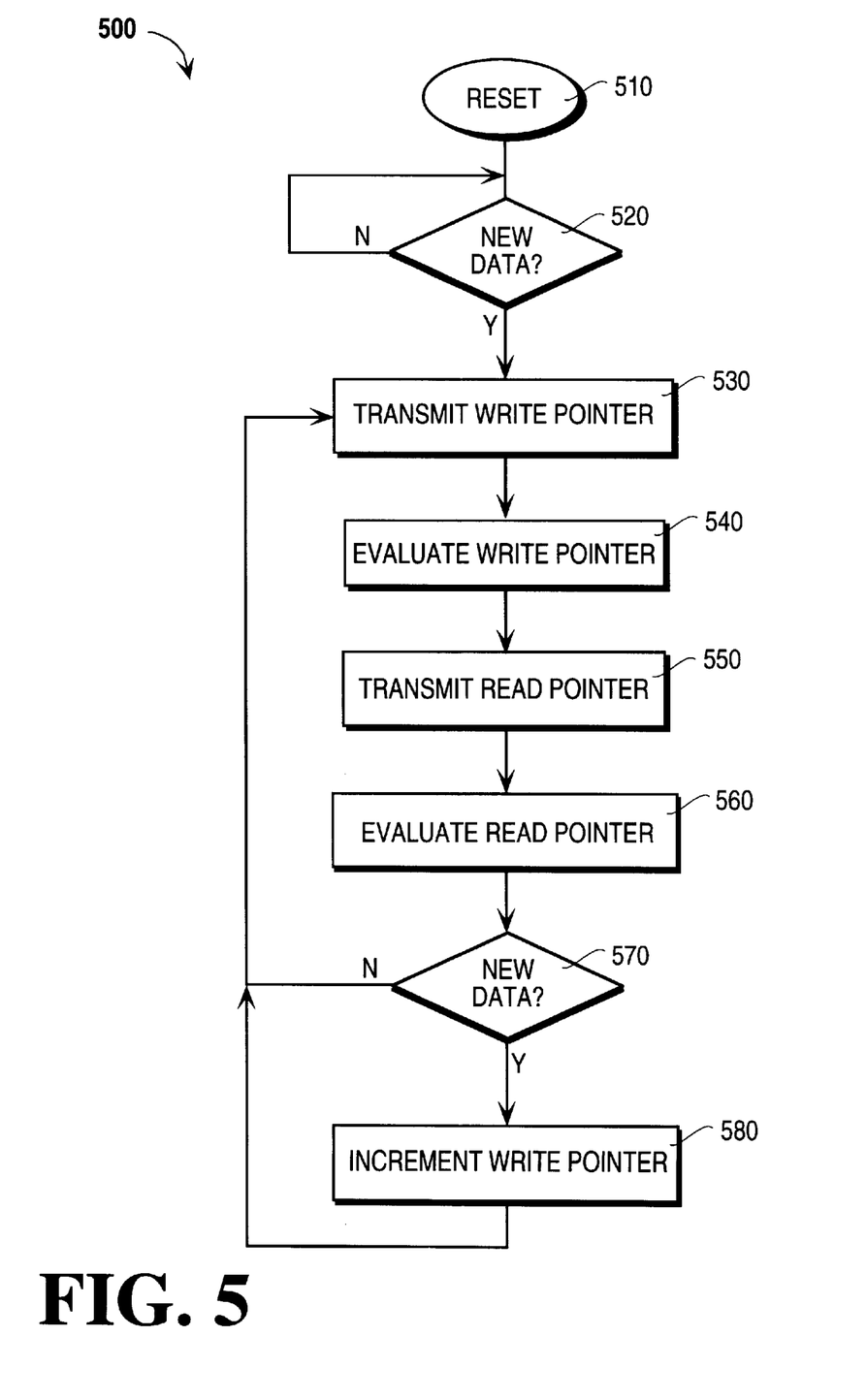
FIG. 5 shows one embodiment of the steps used by component 200 to implement pointer based data transfer.

As previously described, for one embodiment, component 200 conditions the transfer of data based on the successful transmission of read and write pointers. FIG. 5 shows one embodiment of the steps used by component 200 to implement pointer based data transfer. In particular, flowchart 500 shows the steps followed by component 200 to transmit data to component 205 without race conditions and without the use of metastable synchronizers.

Step 510 is the initial step in flowchart 500. In step 510, components 200 and 205 are reset. Subsequent to the reset, component 200 initiates an acknowledge signal along STROBE 225. In particular, the acknowledge signal and the toggled acknowledge signal are exchanged in a cyclical manner along STROBE 225 and ACK 235. As previously described, the exchange of acknowledge signals provides a hand shake mechanism that allows the exchange of pointer information in a frequency independent manner between component 200 and component 205. After the initialization of the acknowledge signal, flowchart 500 transitions to step 520.

In step 520, logic 250 determines whether new data is available for transmission to component 205. For one embodiment, logic 250 includes a transmitting first-first-out ("FIFO") buffer (not shown) that stores the new data prior to transmission. Thus, in step 520 logic 250 checks to see if new data is stored in the transmitting FIFO. Provided no new data is available, flowchart 500 remains in step 520. However, provided new data is available, flowchart 500 transitions to step 530.

In step 530, component 200 transmits a write pointer indicating the memory location of the buffered data. In particular, for one embodiment, component 200 transmits the write pointer to component 205 via DATA 215.

After component 200 transmits the write pointer, flowchart 500 transitions to step 540.

In step 540 the write pointer is evaluated. Specifically, component 205 compares the transmitted write pointer to a local read pointer. Similar to the write pointer, the local read pointer indicates the amount of data stored in a receiving FIFO buffer (not shown) of component 206. For one embodiment, a segment of the new data is transmitted in conjunction with the write pointer.

Component 205 reads the transmitted segment of data into the receiving FIFO buffer and increments the read pointer accordingly. For an alternative embodiment, the receiving FIFO buffer can only accept a subset of the transmitted segment of data. Component 205 reads the subset of data into the receiving FIFO buffer and increments the read pointer accordingly. After component 205 increments the read pointer, flowchart 500 transitions to step 550.

In step 550, component 205 transmits the updated read pointer to component 200. In particular, for one embodiment, component 205 transmits the read pointer to component 200 via ACK 235. For an alternative embodiment, component 205 transmits the read pointer to component 200 ia a data bus. After component 205 transmits the read pointer, flowchart 500 transitions to step 560.

In step 560, the read pointer is evaluated by logic 250 to determine the amount of data received by component 205. For one embodiment, logic 250 subtracts the transmitted write pointer from the read pointer to determine the amount of data received by processor 205. After logic 250 determines the amount of data received by component 205, flowchart 500 transitions to step 570.

In step 570, logic 250 determines whether new data is available in component 200 for transmission to component 205. Provided no new data is available, flowchart 500 returns to step 530. However, provided new data is available, flowchart 500 transitions to step 580.

In step 580, logic 250 increments the write pointer to indicate the new data. For one embodiment, the transmitting FIFO is a circular FIFO buffer. Thus, to prevent the overwriting of data, logic 250 ensures that the transmit pointer does not pass the read pointer. In particular, based on the read pointer evaluation step—described above in step 560—, logic 250 stalls writing new data to the transmitting FIFO. For an alternate embodiment, logic 250 stalls writing data to the transmitting FIFO until a predetermined space is reached between the write pointer and the read pointer.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A transmit circuit operable to synchronize a data transmission to a component, the transmit circuit comprising:

a first circuit configured to transmit a plurality of data segments to the component;

a second circuit coupled to the first circuit for detecting transmission of the plurality of data segments, wherein the second circuit is configured to generate a strobe signal having a first state, the strobe signal indicating the transmission of a first data segment of the plurality of data segments;

a third circuit coupled to the second circuit and the first circuit, wherein the third circuit is configured to receive an acknowledge signal from the component, the acknowledge signal having a second state opposite to the first state of the strobe signal the third circuit determining the transmission of a second data segment of the plurality of data segments based on detection of the acknowledge signal having the second state; and a select circuit included in the first circuit and coupled to the third circuit, the select circuit configured to transmit the second data segment up on detection of the acknowledge signal having the second state.

2. The transmit circuit of claim 1, wherein the first circuit further comprises a first latch having an output for transmitting the first data segment, the first latch being coupled to the select circuit.

3. The transmit circuit of claim 2, wherein the second circuit comprises:

a first logic block having two inputs and an output, the first input coupled to a select node of the select circuit and the second input coupled to the strobe signal;

a second latch coupled to the output of the first logic block, wherein the second latch generates the strobe signal.

4. The transmit circuit of claim 3, wherein the third circuit comprises:

a third latch coupled to the acknowledge signal;

a fourth latch coupled to the third latch and to the output of the first latch; and a second logic block having two inputs and an output, wherein the first input is coupled to the output of the fourth latch, the second input is coupled to the output of the first latch, and the output is coupled to the select node of the select circuit.

5. A first component operable to transfer data to a second component using a transmit circuit, the transmit circuit comprising:

a first circuit configured to transmit a plurality of data segments to the second component;

a second circuit coupled to the first circuit for detecting transmission of the plurality of data segments, wherein the second circuit is configured to generate a strobe signal having a first state, the strobe signal indicating the transmission of a first data segment;

a third circuit coupled to the second circuit and the first circuit, wherein the third circuit is configured to receive an acknowledge signal from the second component, the acknowledge signal having a second state opposite to the first state of the strobe signal, the third circuit determining the transmission of a second data segment based on detection of the acknowledge signal having the second state; and a select circuit included in the first circuit and coupled to the third circuit the select circuit configured to transmit the second data segment upon detection of the acknowledge signal having the second state.

6. The first component of claim 5, wherein the first circuit further comprises a first latch having an output for transmitting the first data segment, the first latch being coupled to the select circuit.

7. The first component of claim 6, wherein the second circuit comprises:

a first logic block having two inputs and an output, the first input coupled to a select node of the select circuit and the second input coupled to the strobe signal;

a second latch coupled to the output of the first logic block, wherein the second latch generates the strobe signal.

8. The first component of claim 7, wherein the third circuit comprises:

a third latch coupled to the acknowledge signal;

a fourth latch coupled to the third latch and to the output of the first latch; and a second logic block having two inputs and an output, wherein the first input is coupled to the output of the fourth latch, the second input is coupled to the output of the first latch, and the output is coupled to the select node of the select circuit.

9. A method for transferring a plurality of data blocks from a first component to a second component, the method comprising the steps of:

determining whether new data is available for transmission in a first circuit of the first component;

transmitting a first block of the plurality of data blocks to the second component;

transmitting a strobe signal having a first logic state from a second circuit of the first component to the second component with the first block;

receiving an acknowledge signal having a second logic state of opposite logic value than the first logic state of the strobe signal from the second component in a third circuit of the first component; and transmitting a second block of the plurality of data blocks to the second component from a select circuit included in the first circuit of the first component, the select circuit being coupled to the third circuit and configured to transmit the second block, wherein the transmission of the second block is triggered by detection in the first component of the acknowledge signal having the second logic state.

10. A method for transferring data from a first component to a second component, the method comprising the steps of:

determining whether new data is available for transmission in a first circuit of the first component;

updating a write pointer to indicate a location of the new data in the first circuit;

transmitting a write pointer and a first segment of the new data from the first component to the second component;

transmitting a read pointer from the second component to the first component, wherein the read pointer indicates the processing of a subset of the first segment of new data; and transmitting a second segment of the new data from the first component to the second component, wherein the transmission of the second segment of the new data is triggered by a difference in value between the write pointer and the read pointer.

11. The method of claim 10, wherein the step of transmitting a write pointer comprises transmitting a strobe signal, wherein the strobe signal synchronizes the write pointer transmission between the first component and the second component.

12. The method of claim 11, wherein the step of transmitting the read pointer comprises transmitting an acknowledge signal, wherein the acknowledge signal synchronizes the read pointer transmission between the first component and the second component.

* * * * *

UNITED STATES PATENT AND TRADEMARK OFFICE
CERTIFICATE OF CORRECTION

PATENT NO.    : 6,067,629
DATED         : May 23, 2000
INVENTOR(S)   : Murray et al.

It is certified that error appears in the above-identified patent and that said Letters Patent is hereby corrected as shown below:

Column 6,
Line 25, delete "component", insert -- Component --.
Line 26, delete "15", insert -- 415 --.

Signed and Sealed this

Seventeenth Day of December, 2002

JAMES E. ROGAN
*Director of the United States Patent and Trademark Office*